United States Patent
Challa et al.

(10) Patent No.: US 8,761,316 B2
(45) Date of Patent: Jun. 24, 2014

(54) SYSTEMS AND METHODS FOR APPROXIMATING LOG LIKELIHOOD RATIOS IN A COMMUNICATION SYSTEM

(75) Inventors: Raghu N. Challa, San Diego, CA (US); Hemanth Sampath, San Diego, CA (US); Sameer Vermani, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 659 days.

(21) Appl. No.: 12/406,868

(22) Filed: Mar. 18, 2009

(65) Prior Publication Data

US 2009/0245433 A1 Oct. 1, 2009

Related U.S. Application Data

(60) Provisional application No. 61/040,496, filed on Mar. 28, 2008.

(51) Int. Cl.
*H04L 27/06* (2006.01)

(52) U.S. Cl.
USPC ........... 375/341; 375/136; 375/147; 375/262; 375/265; 375/316; 375/340

(58) Field of Classification Search
USPC ......... 375/136, 147, 262, 265, 316, 340, 341; 714/755
See application file for complete search history.

(56) References Cited

U.S. PATENT DOCUMENTS

| | | | |
|---|---|---|---|
| 6,542,558 B1 | 4/2003 | Schulist et al. | |
| 6,594,318 B1 * | 7/2003 | Sindhushayana | 375/262 |
| 7,302,012 B2 | 11/2007 | Kim et al. | |
| 7,421,638 B2 | 9/2008 | Hewitt et al. | |
| 2007/0127589 A1 * | 6/2007 | Hwang et al. | 375/267 |
| 2007/0260959 A1 * | 11/2007 | Sidi et al. | 714/755 |
| 2009/0125793 A1 | 5/2009 | Kishigami et al. | |
| 2009/0238287 A1 | 9/2009 | Lee | |

FOREIGN PATENT DOCUMENTS

| | | |
|---|---|---|
| CN | 101095326 A | 12/2007 |
| JP | 2009534875 A | 9/2009 |
| WO | WO2007106876 | 9/2007 |

OTHER PUBLICATIONS

International Search Report & Written Opinion—PCT/US09/038055 International Search Authority—European Patent Office—Aug. 11, 2009.

* cited by examiner

*Primary Examiner* — Shuwang Liu
*Assistant Examiner* — Ross Varndell
(74) *Attorney, Agent, or Firm* — Abdollah Katbab

(57) ABSTRACT

Systems and methods for computing log likelihood ratios in a communication system are described. A demodulated symbol may be received. A set of scalars may be determined based on a modulation order, a signal-to-noise ratio for the symbol, and a bit of the symbol. At least one log likelihood ratio for the bit may be approximated using a piecewise linear process based on the scalars and the symbol.

38 Claims, 13 Drawing Sheets

SYSTEMS AND METHODS FOR APPROXIMATING LOG LIKELIHOOD RATIOS IN A COMMUNICATION SYSTEM

RELATED APPLICATIONS

This application is related to and claims priority from U.S. Patent Application Ser. No. 61/040,496 filed Mar. 28, 2008, for "Low Complexity Technique for LLR Computation with Performance Gains in OFDMA Systems with a High Dynamic Range Requirement on SNR," with inventors Raghu Challa, Hemanth Sampath, and Sameer Vermani, which is incorporated herein by reference.

TECHNICAL FIELD

The present disclosure relates to communication systems. Specifically, the present disclosure relates to approximating log likelihood ratios in a communication system.

BACKGROUND

Wireless communication systems have become an important means by which many people worldwide have come to communicate. A wireless communication system may provide communication for a number of mobile stations, each of which may be serviced by a base station. As used herein, the term "mobile station" refers to an electronic device that may be used for voice and/or data communication over a wireless communication system. Examples of mobile stations include cellular phones, personal digital assistants (PDAs), handheld devices, wireless modems, laptop computers, personal computers, etc. A mobile station may alternatively be referred to as an access terminal, a mobile terminal, a subscriber station, a remote station, a user terminal, a terminal, a subscriber unit, a mobile device, a wireless device, user equipment, or some other similar terminology. The term "base station" refers to a wireless communication station that is installed at a fixed location and used to communicate with mobile stations. A base station may alternatively be referred to as an access point, a Node B, an evolved Node B, or some other similar terminology.

A mobile station may communicate with one or more base stations via transmissions on the uplink and the downlink. The uplink (or reverse link) refers to the communication link from the mobile station to the base station, and the downlink (or forward link) refers to the communication link from the base station to the mobile station.

The resources of a wireless communication system (e.g., bandwidth and transmit power) may be shared among multiple mobile stations. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

Benefits may be realized by improved methods and apparatus related to the operation of wireless communication systems.

DETAILED DESCRIPTION

Figure 1:
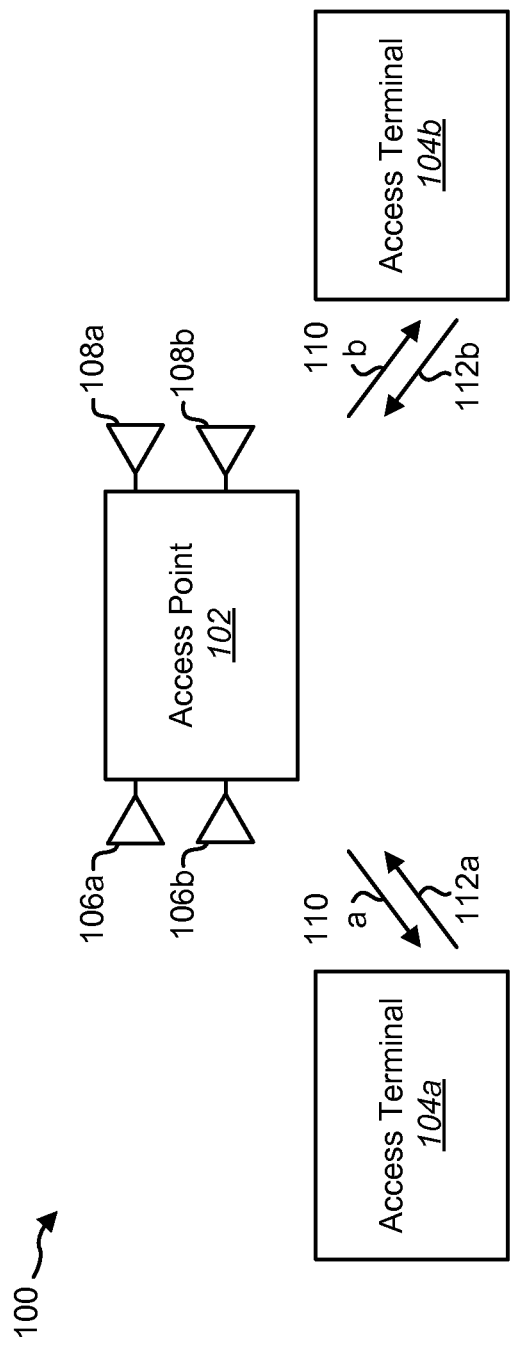
FIG. 1 is a block diagram illustrating a wireless communication system in which the methods disclosed herein may be utilized.

A method for computing log likelihood ratios in a communications system is disclosed. A demodulated symbol is received. A set of scalars based on a modulation order, a signal-to-noise ratio for the symbol, and a bit of the symbol are determined. At least one log likelihood ratio is approximated for the bit using a piecewise linear process based on the scalars and the symbol.

In one configuration, the modulation order may be a metric that indicates a modulation technique that was used to modulate the symbol. Furthermore, the symbol that is received may have been modulated using Quadrature Phase Shift Keying (QPSK), 8 Phase Shift Keying (8PSK), 16 Quadrature Amplitude Modulation (16QAM), 32 Quadrature Amplitude Modulation (32QAM), 64 Quadrature Amplitude Modulation (64QAM) or 256 Quadrature Amplitude Modulation (256QAM).

The approximating may include determining a line where some of the scalars indicate a slope for the line and some of the scalars indicate a vertical intercept for the line. More than one line may be determined if the modulation order indicates that the symbol was modulated using 16 Quadrature Amplitude Modulation (16QAM), 32 Quadrature Amplitude Modulation (32QAM), 64 Quadrature Amplitude Modulation (64QAM) or 256 Quadrature Amplitude Modulation (256QAM). A log likelihood ratio may be approximated for every bit in the symbol. Furthermore, the approximating may use the in-phase bits of the symbol (I) and not the quadrature bits of the symbol (Q), or the approximating may use the quadrature bits of the symbol (Q) and not the in-phase bits of the symbol (I). More than one log likelihood ratio may be combined.

An apparatus for computing log likelihood ratios in a communications system is also disclosed. The apparatus includes a processor and memory in electronic communication with the processor. Executable instructions are stored in the memory. The instructions are executable to receive a demodulated symbol. The instructions are also executable to determine a set of scalars based on a modulation order, a signal-to-noise ratio for the symbol, and a bit of the symbol. The instructions are also executable to approximate at least one log likelihood ratio for the bit using a piecewise linear process based on the scalars and the symbol.

An apparatus for computing log likelihood ratios in a communications system is also disclosed. The apparatus include means for receiving a demodulated symbol. The apparatus also includes means for determining a set of scalars based on a modulation order, a signal-to-noise ratio for the symbol, and a bit of the symbol. The apparatus also includes means for approximating at least one log likelihood ratio for the bit using a piecewise linear process based on the scalars and the symbol.

A computer-program product for computing log likelihood ratios in a communication system is also disclosed. The computer-program product comprises a computer-readable medium having instructions thereon. The instructions include code for receiving a demodulated symbol. The instructions also include code for determining a set of scalars based on a modulation order, a signal-to-noise ratio for the symbol, and a bit of the symbol. The instructions also include code for approximating at least one log likelihood ratio for the bit using a piecewise linear process based on the scalars and the symbol.

Digital signals, such as those used in cellular telephones, may be modulated and transmitted wirelessly. Various modulation techniques may use symbols, or groupings of digital bits, to transmit information. One way of determining the value of a received symbol may be to use one or more log likelihood ratios (LLR).

One goal of an LLR module may be to convert the demodulated symbols and associated SNR estimates to a sequence of LLRs. For example, an LLR module in a cellular phone may receive a triplet (Yi,Yq,SNR) of demodulated data that may be converted into M LLRs where M is the modulation order. For example, M may equal 2 for QPSK, 3 for 8-PSK, 4 for 16-QAM and 6 for 64-QAM.

For example, in one configuration Y may represent the complex demodulated symbol and S may represent the signal to noise ratio (SNR). Furthermore, x may represent the constellation point, and v may represent the noise that may be modeled with a Gaussian distribution with a mean of 0 and power of 1. In this configuration, the demodulated symbol, Y, may take the form:

$$Y = Sx + \sqrt{S}v \qquad (1)$$

For this configuration, the LLR for each bit $b_j$ (j=0 to M−1) may be computed as follows:

$$LLR(b_j) = \log \frac{\sum_{x b_j=0} \exp\left(\frac{-|Y-Sx|^2}{S}\right)}{\sum_{x b_j=1} \exp\left(\frac{-|Y-Sx|^2}{S}\right)} \qquad (2)$$

In the above expression, the probabilities of all modulation symbols, Y, where the bit $b_j$ is a "0," may be summed to obtain the term in the numerator. Similarly, the denominator may be the sum of the probabilities of all the modulation symbols where the bit $b_j$ is a "1". The LLR may be the logarithm of the ratio of these two quantities.

When implemented exactly, equation (2) may be computationally intensive. Thus, it may be desirable to compute an LLR using piecewise linear or asymptotic linear approximations.

Assuming Gray Code mapping of transmitted bits to the constellation point x, for square QAM constellations such as QPSK, 16-QAM and 64-QAM, the computation of the LLR may depend either on Re[Y] or Im[Y], but not both (this simplification may also apply to bits $b_1$ and $b_2$, but not for bit $b_0$ of 8-PSK). For example, the computation of LLR of the $b_0$ bit in QPSK may depend only on the Q-component (Im[Y]), while the computation of the $b_1$ bit may depend only on the I-component (Re[Y]). This is because the terms corresponding to the other component are the same in the numerator and denominator of the LLR equation and hence get cancelled out. This fact may be exploited to reduce the complexity of LLR generation.

The equation of a line is modeled by y=(slope)*x+(y-intercept). The present systems and methods may model the LLRs piecewise linearly that may utilize primary scalars A and B, where A represents the slope of the LLR linear approximation and B represents the vertical intercept. Note that for 16QAM and 64QAM modulations, the LLRs may be approximated using multiple line segments defined by a relative comparison between a demodulated symbol and a signal-to-noise ratio (SNR). Note also that the 8PSK-c0 LLR may require a modified approximation. Thus, by using a piecewise, linear process, the present systems and methods may enable an accurate, low-complexity, unified LLR approximation.

FIG. 1 is a block diagram illustrating a wireless communication system 100 in which the methods disclosed herein may be utilized. The wireless communication system 100 may include one or more access points (AP) 102 that each may include multiple antenna groups. For example, the AP 102 may include two antenna groups, a first group 106 including a first antenna 106a and a second antenna 106b, and a second group 108 including a third antenna 108a and a fourth antenna 108b. While the configuration illustrates each antenna group with two antennas, more or fewer antennas may be included in each antenna group. The wireless communication system 100 may also include a first access terminal (AT) 104a that communicates with the first antenna group 106, where the first antenna 106a and second antenna 106b transmit information to the first access terminal 104a over a first forward link 110a and receive information from the first access terminal 104a over a first reverse link 112a. Likewise, the wireless communication system 100 may also include a second access terminal (AT) 104b that communicates with the second antenna group 108, where the third antenna 108a and the fourth antenna 108b transmit information to the second access terminal 104b over a second forward link 110b and receive information from the second access terminal 104b over a second reverse link 112b. In the wireless communication system 100, the forward communication links 110 may use different frequencies for communication than the reverse communication links 112.

Each group of antennas and/or the area in which they are designed to communicate is often referred to as a sector of the AP 102. In the illustrated configuration, the antenna groups may be designed to communicate to all ATs 104 in a sector. In other words, each antenna group may be responsible for communicating with all of the ATs 104 in a geographic area.

When communicating over the forward links 110, the transmitting antennas may utilize beamforming in order to improve the signal-to-noise ratio in the ATs 104. Additionally, the AP 102 may use beamforming when communicating with ATs 104 scattered randomly throughout its coverage in order to minimize interference.

The AP 102 may be a fixed station used for communicating with the ATs 104 and may be referred to as a base station, a Node B, or some other terminology. The ATs 104 may be referred to herein as user equipment (UE), wireless communication devices, terminals, or some other terminology.

It should be noted that the wireless communication system 100 may include more than one AP 102 and more or fewer than two ATs 104. Additionally, the AP 102 may communicate using any suitable channel access method, e.g., Frequency Division Multiple Access (FDMA), Code Division Multiple Access (CDMA), Orthogonal Frequency Division Multiple Access (OFDMA), etc.

Figure 2:
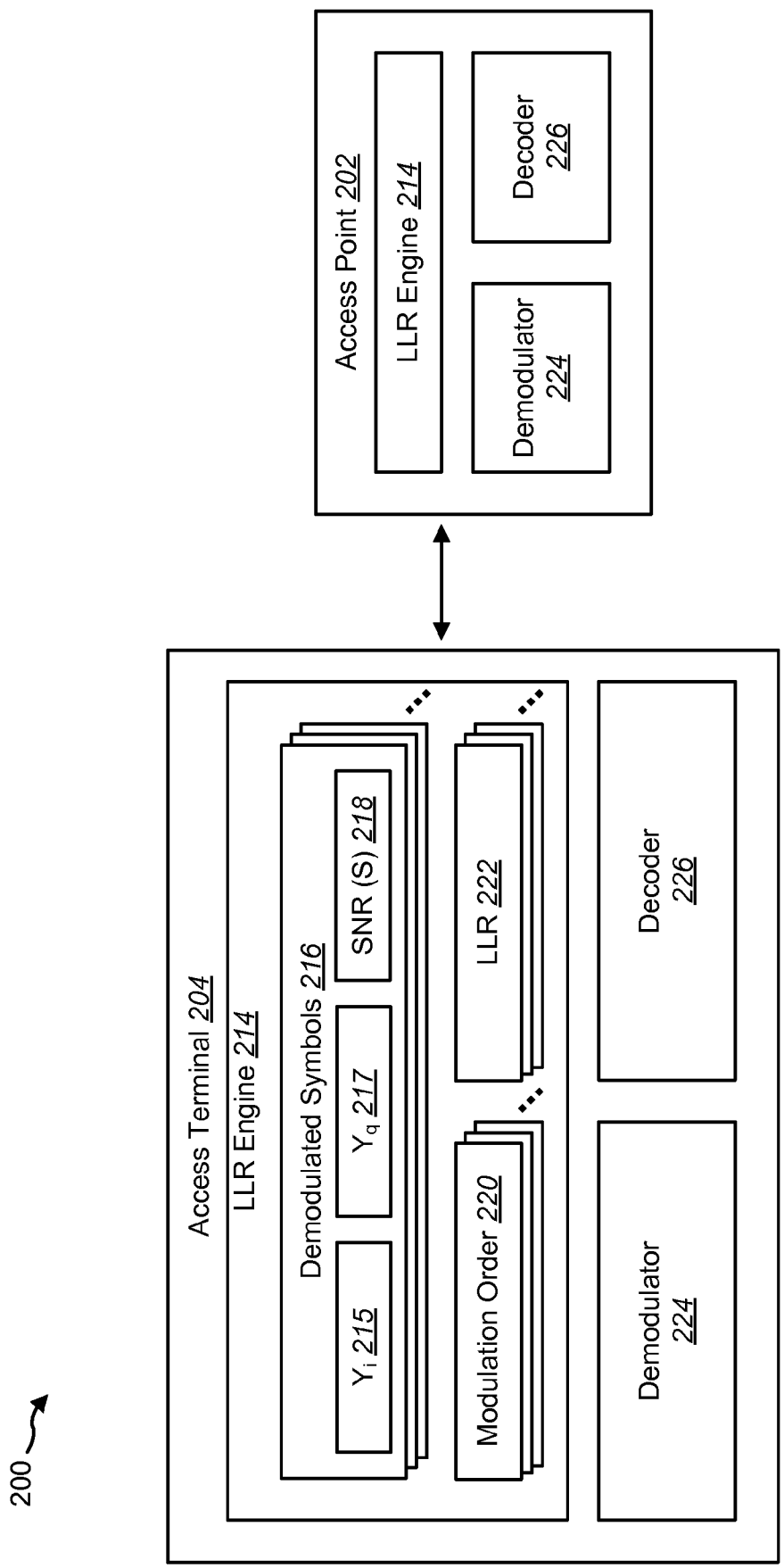
FIG. 2 is a block diagram of a system for approximating log likelihood ratios in a communication system.

FIG. 2 is a block diagram of a system 200 for approximating log likelihood ratios in a communication system. The AT 204 may receive a signal from the AP 202 that has been modulated. A demodulator 224 on the AT 204 may demodulate the received signal and produce demodulated symbols 216. Each demodulated symbol 216 may include a real portion (Yi) 215, a complex portion (Yq) 217, and a related Signal to Noise Ratio (SNR) 218. Thus, an LLR engine 214 in the AT 204 may receive as input the demodulated symbols 216, each with an in-phase component (Yi) 215 and a quadrature component (Yq) 217, and an SNR 218. Additionally, the LLR engine 214 may receive a modulation order 220 for the received signal as input. The modulation order 220 may be any value that indicates the modulation technique that was used to modulate the received signal. For example, the modulation order may equal 2 for QPSK, 3 for 8-PSK, 4 for 16-QAM and 6 for 64-QAM. Then, using the demodulated symbols 216, the SNR 218, and the modulation order 220, among other data, the LLR engine 214 may then calculate LLRs 222 for each bit in each demodulated symbol 216. The LLRs 222 may be sent to a decoder 226 for further processing.

The AP 202 may include similar modules to the AT 204. In other words, the AP 202, in addition to the AT 204, may implement the systems and methods described herein to approximate log likelihood ratios. For example, in a phone conversation, the AT 204 may receive a signal from the AP 202 for which the AT 204 may approximate log likelihood ratios 222. Likewise, the AP 202 may receive a signal from the AT 204 for which the AP 202 may approximate log likelihood ratios 222.

Figure 3:
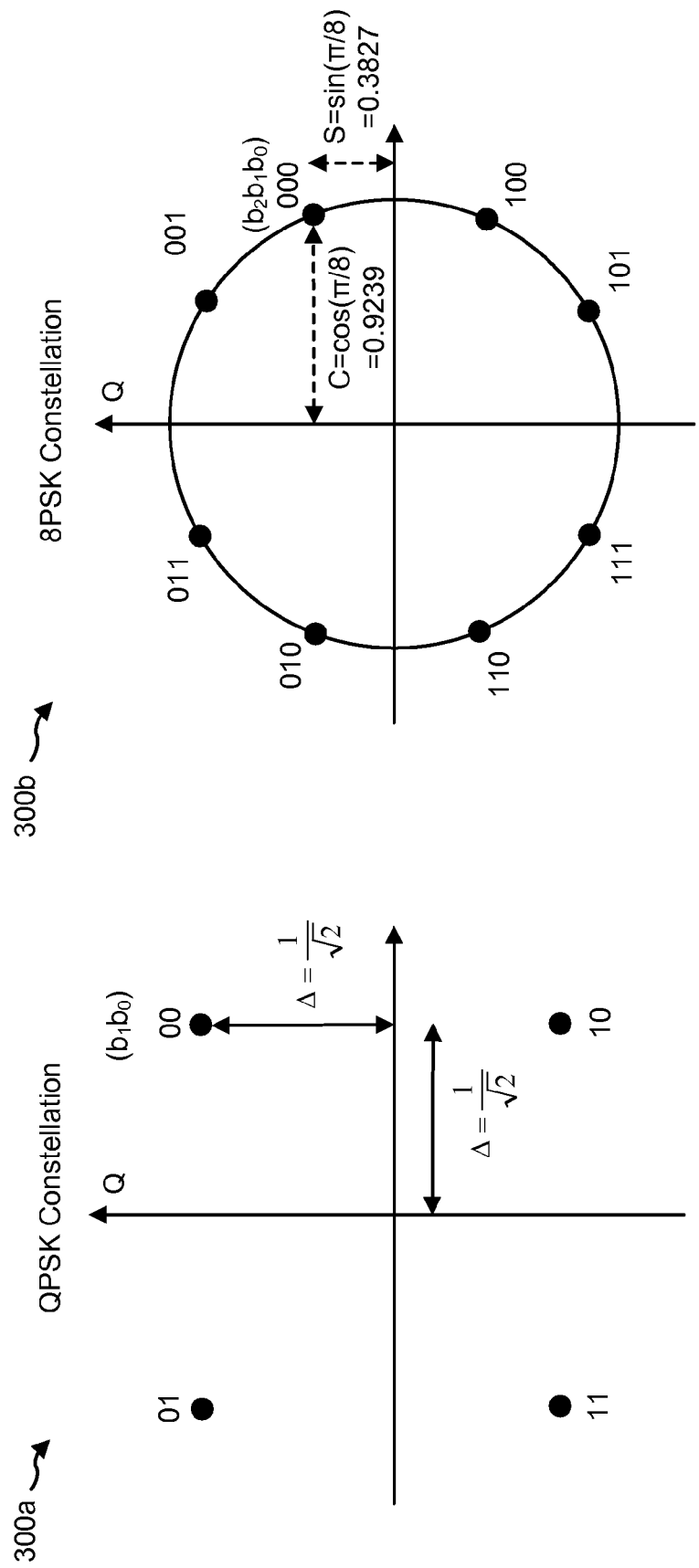
FIG. 3 illustrates four configurations of a constellation diagram.
Figure 3:
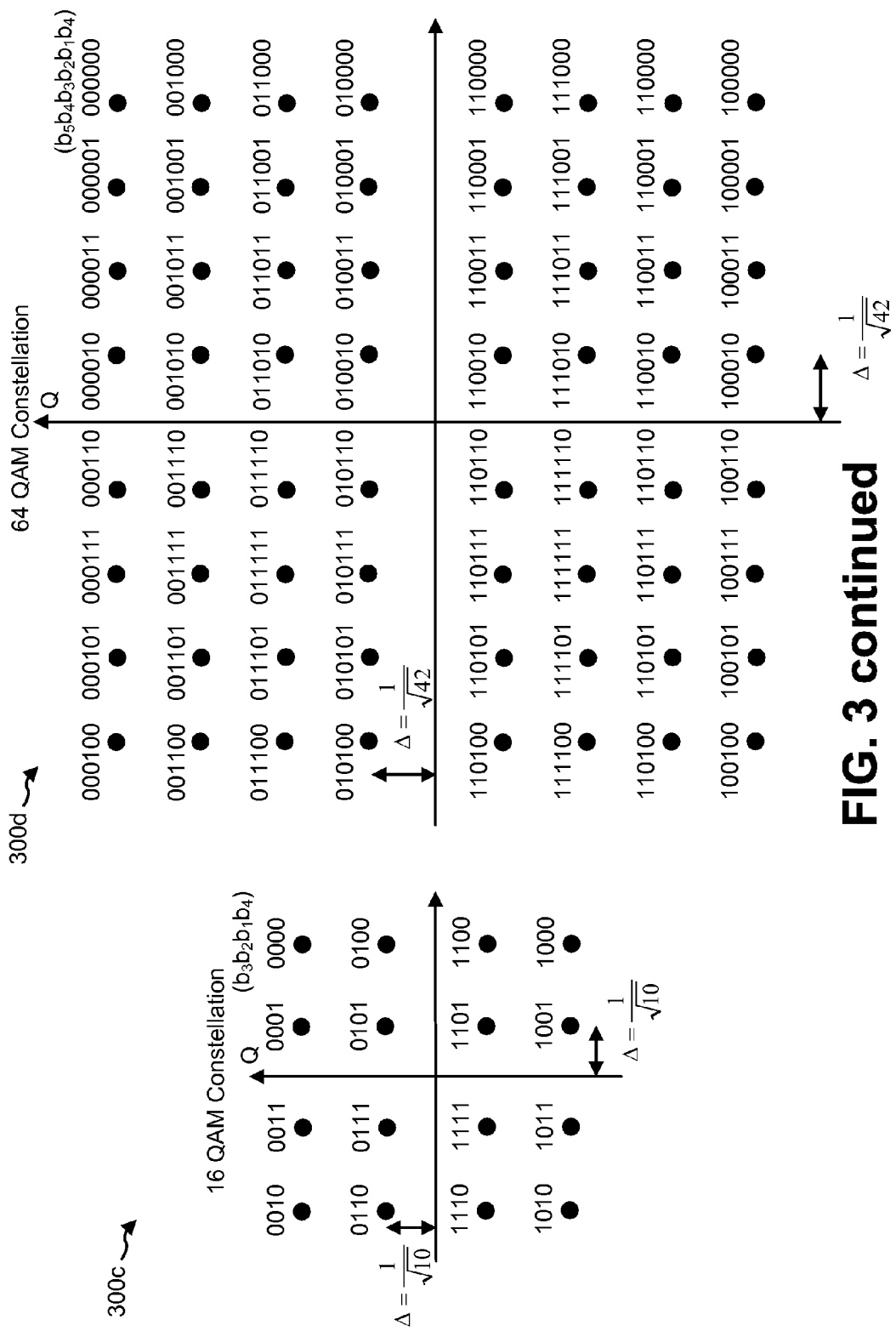

FIG. 3 illustrates four configurations of a constellation diagram 300. The first diagram 300a may be for Quadrature Phase Shift Keying (QPSK) modulation. QPSK modulation may use four points on the constellation diagram 300a, in a square configuration. With four points, QPSK modulation may encode two bits of a message into a symbol. Similarly, the second diagram 300b may be for 8 Phase Shift Keying (8PSK) modulation. 8PSK modulation may use eight points on the constellation diagram 300b, equispaced around a circle. With eight points, QPSK modulation may encode three bits of a message into a symbol. Similarly, the third diagram 300c may be for 16 Quadrature Amplitude Modulation (16QAM). 16QAM modulation may use sixteen points on the constellation diagram 300c, in a square configuration. With sixteen points, QPSK modulation may encode four bits of a message into a symbol. Similarly, the fourth diagram 300d may be for 64 Quadrature Amplitude Modulation (64QAM). 64QAM modulation may use 64 points on the constellation diagram 300d, in a square configuration. With 64 points, QPSK modulation may encode six bits of a message into a symbol. While diagrams 300 for QPSK, 8PSK, 16QAM, and 64QAM are illustrated, any modulation scheme with a corresponding constellation diagram may be used with the systems and methods disclosed herein.

Figure 4:
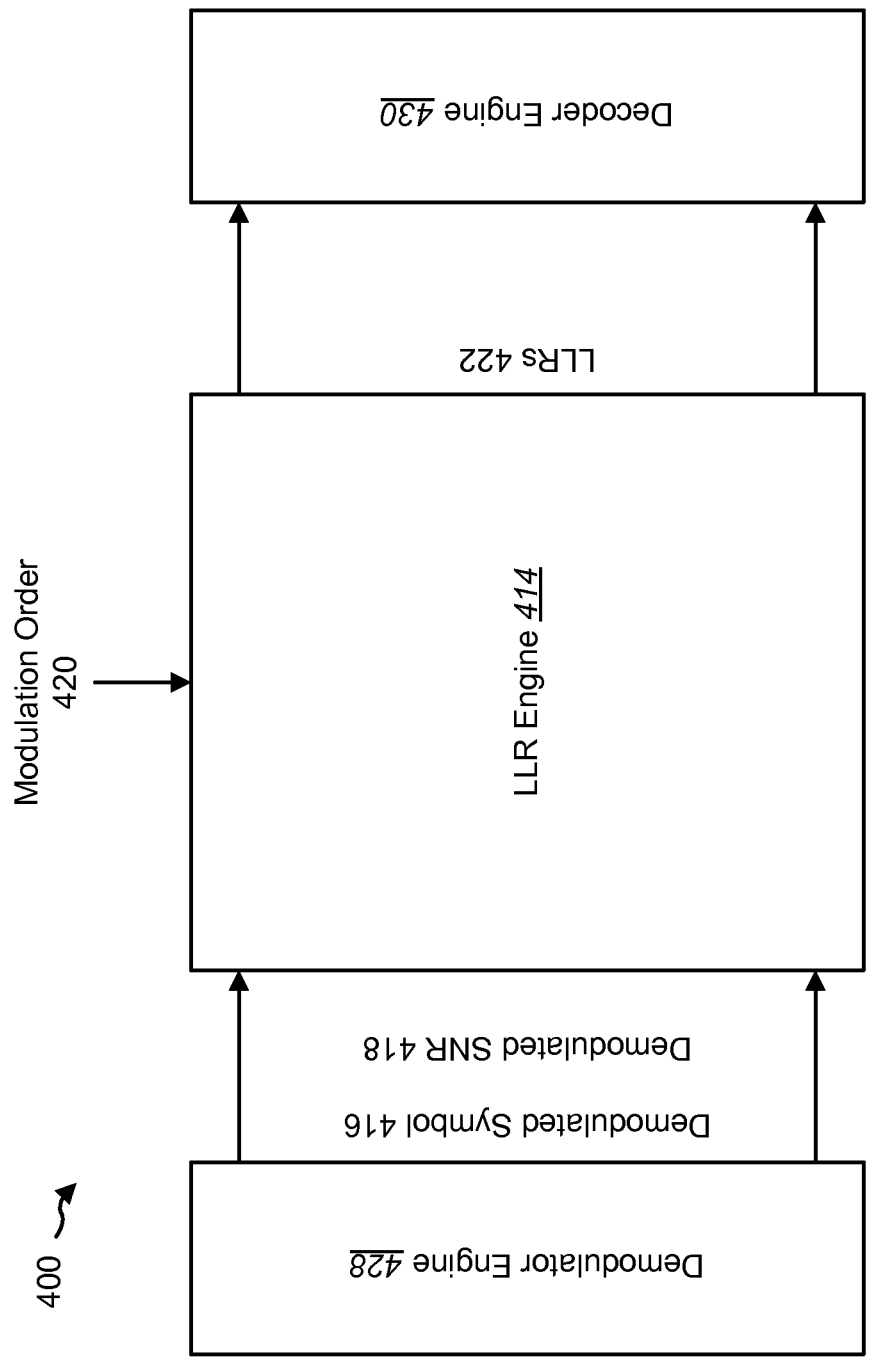
FIG. 4 is a block diagram illustrating a system for approximating log likelihood ratios in a communication system.

FIG. 4 is a block diagram illustrating a system 400 for approximating log likelihood ratios in a communication system. The system 400 may reside in an AT 204, an AP 202, or both. The LLR engine 414 may receive demodulated symbols 416 and a demodulated SNR 418 from a demodulator engine 428 that may include a demodulator 224. Similarly, the LLR engine 414 may receive a modulation order 420 that indicates the modulation technique used for the received signal. Based on the demodulated symbols 416, the demodulated SNR 418, and the modulation order 420, the LLR engine 414 may approximate an LLR 422 for every bit in every symbol. The LLRs 422 may be sent to a decoder engine 430 that may include a decoder 226.

Figure 5:
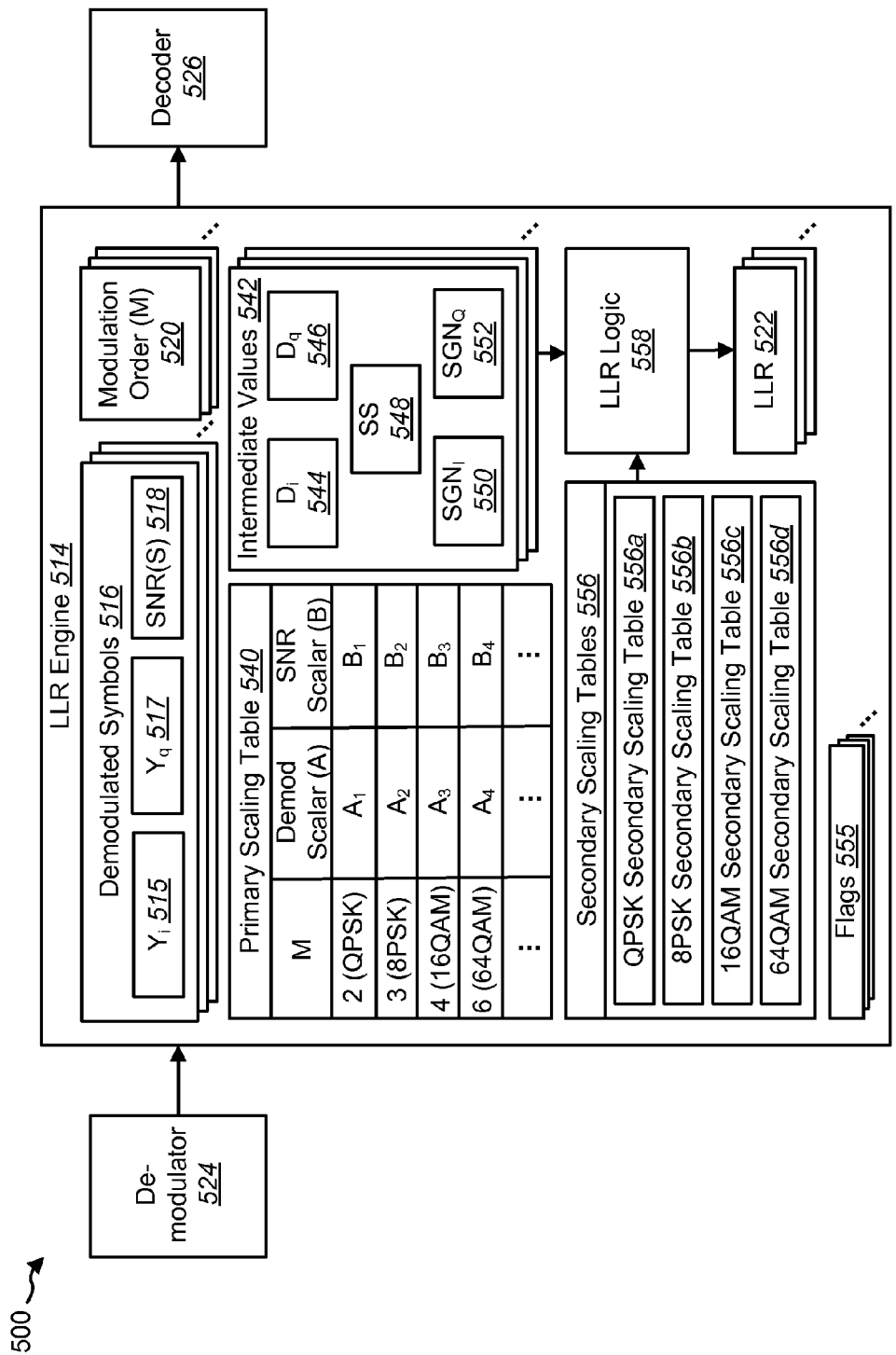
FIG. 5 is a block diagram of a system for approximating log likelihood ratios in a communication system.

FIG. 5 is a block diagram of a system 500 for approximating log likelihood ratios in a communication system. The system 500 may reside in an AT 204, an AP 202, or both. A demodulator 524 may perform one or more demodulation operations to produce one or more demodulated outputs. In other words, the demodulation scheme may correspond to the modulation scheme used to modulate the received signal, e.g., 2-bit data (QPSK), 3-bit data (8PSK), 4-bit data (16 QAM) and/or 6-bit data (64 QAM), etc. Additional techniques such as Minimum Mean Square Error (MMSE) or Maximum Ratio Composition (MRC) may also be used. Note that each symbol 516 may include a real portion (Yi) 515, a complex portion (Yq) 517, and a related Signal to Noise Ratio (SNR) 518.

The system 500 may also include an LLR engine 514 for computing log likelihood ratios 522. In one configuration, the LLR engine 514 may use a piecewise linear approximation to estimate the LLRs 522. In other words, the LLR engine 514 may use a different slope scalar (A) and vertical intercept scalar (B) depending on the SNR (S) 518 range. First, the LLR engine 514 may use the demodulated symbols 516 that include Yi 515, Yq 517, and S 518 portions, a modulation order (M) 520, and a primary scaling table 540 to calculate a set of intermediate values 542. The primary scaling table 540 may be a data structure that includes a set of fixed values that are dependent on the modulation order 520 used for the demodulated symbols 516. For example, in the configuration shown in FIG. 5, when M=2, the demodulating scalar (A) is set to A1 and the SNR Scalar (B) is set to B1. Similarly, when M=3, the demodulating scalar (A) is set to A2 and the SNR Scalar (B) is set to B2, etc. Values for the demodulating scalars (A) may include $$0, \sqrt{2}, \cos\left(\frac{\pi}{4}\right), 2\sqrt{2}, \frac{2}{\sqrt{10}}, \frac{2}{\sqrt{42}},$$

$$2\left[\cos\left(\frac{\pi}{8}\right) + \sin\left(\frac{\pi}{8}\right)\right], \text{ and } 2*0.64\left[\cos\left(\frac{\pi}{8}\right) + \sin\left(\frac{\pi}{8}\right)\right].$$

Values for the SNR scalars (B) may include 0, 4/10, 2/10, 5/9, and 2/21. While the illustrated configuration of the primary scaling table 540 is shown with demodulating scalars (A) and SNR scalars (B) dependent only on the modulation order (M) 520, A and B may also be dependent on the SNR (S) 518 range for the demodulated symbol 516. For example, A4 may be one value if S<5 dB and a different value if S≥5 dB. Furthermore, the primary scaling table 540 may use any suitable data structure to store A and B for each modulation order (M) 520, e.g., array, linked list, map, set, etc.

Using the primary scaling table 540, the LLR engine 514 may scale the demodulated symbols 516 to linearly approximate an LLR 522 for each bit in each symbol 516. In other words, A and B may be used to scale the slope and vertical intercept of a line that wholly or partially approximates the LLR 522. This may include determining a set of intermediate values 542 that include Di 544, Dq 546, SS 548, $SGN_I$ 550, and $SGN_Q$ 552. The intermediate values 542 may be determined according to the following equations:

$$Di = A * |Yi| \quad (3)$$

$$Dq = A * |Yq| \quad (4)$$

$$SS = B * S \quad (5)$$

$SGN_I$=Sign($Yi$)=the sign of the in-phase component
($Yi$) 515, e.g., +1 or −1 (6)

$SGN_Q = \text{Sign}(Yq) =$ the sign of the quadrature component $(Yq)$ 517, e.g., +1 or −1  (7)

Following the determining of the intermediate values 542, the LLR engine 514 may use the intermediate values 542 and a secondary scaling table 554 to approximate the LLRs 522. The secondary scaling table 554 may be a data structure that includes a set of fixed values for each modulation order (M) 520 that are dependent on the bit in the demodulated symbol 516 for which the LLR 522 is being calculated and the value of the SNR (S) 518. The LLR engine 514 may store a secondary scaling table 556 for each modulation order (M) 520, e.g., a QPSK secondary scaling table 556a, an 8PSK secondary scaling table 556b, a 16QAM secondary scaling table 556c, a 64QAM secondary scaling table 556d, etc. Each secondary scaling table 556 may be for only one modulation order (M) 520. In other words, the primary scaling table 540 may include a demodulating scalar (A) and a SNR scalar (B) for all the modulation orders (M) 520, while each secondary scaling table 556 may include only fixed values, $(\alpha_I, \beta_I, \gamma_I)$ and $(\alpha_Q, \beta_Q, \gamma_Q)$, for one modulation order (M) 520. Each value in the secondary scaling tables 556 may further vary based on the bit in the demodulated symbol 516 for which the LLR 522 is being calculated and the SNR (S) 518. The bit of the demodulated symbol 516 for which the LLR 522 is being calculated may be referred to herein as c0, c1, c2, c3, c4, and c5 where a constellation point, and thus a potential symbol 516, is represented in binary form as a sequence, $[c_{M-1}\ c_{M-2} \ldots c_1\ c_0]$ where M is the modulation order 520. The following tables may be examples of secondary scaling tables 556:

TABLE 1

QPSK Secondary Scaling Table 556a

| Secondary Scalings for QPSK | $(\alpha_I, \beta_I, \gamma_I)$ | $(\alpha_Q, \beta_Q, \gamma_Q)$ |
|---|---|---|
| Flags | c0 | c1 |
| All | $(1, 0, SGN_I)$ | $(1, 0, SGN_Q)$ |

TABLE 2

8PSK Secondary Scaling Table 556b

| Secondary Scalings for 8PSK | $(\alpha_I, \beta_I, \gamma_I)$ | $(\alpha_Q, \beta_Q, \gamma_Q)$ |
|---|---|---|
| Flags | c1 | c2 |
| All | $(1, 0, SGN_I)$ | $(1, 0, SGN_Q)$ |

TABLE 3

16QAM Secondary Scaling Table 556c

| Secondary Scalings for 16QAM | $(\alpha_I, \beta_I, \gamma_I)$ | |
|---|---|---|
| Flags | c0 | c1 |
| Fa_I | (2, −2, 0) | (4, −2, $SGN_I$) |
| $\overline{Fa\_I}$ | (2, −2, 0) | (2, 0, $SGN_I$) |

| | $(\alpha_Q, \beta_Q, \gamma_Q)$ | |
|---|---|---|
| Flags | c2 | c3 |
| Fa_Q | (2, −2, 0) | (4, −2, $SGN_Q$) |
| $\overline{Fa\_Q}$ | (2, −2, 0) | (2, 0, $SGN_Q$) |

TABLE 4

64QAM Secondary Scaling Table 556d

| Secondary Scalings for 64QAM | $(\alpha_I, \beta_I, \gamma_I)$ | | |
|---|---|---|---|
| Flags | c0 | c1 | c2 |
| Fb_I | (2, −6, 0) | | |
| $\overline{Fb\_I}$ | (−2, 2, 0) | | |
| Fc_I | | (4, −10, 0) | (8, −12, $SGN_I$) |
| $\overline{Fc\_I}$ and Fa_I | | (2, −4, 0) | (5, −3, $SGN_I$) |
| $\overline{Fc\_I}$ and $\overline{Fa\_I}$ | | (4, −6, 0) | (2, 0, $SGN_I$) |

| | $(\alpha_Q, \beta_Q, \gamma_Q)$ | | |
|---|---|---|---|
| Flags | c3 | c4 | c5 |
| Fb_Q | (2, −6, 0) | | |
| $\overline{Fb\_Q}$ | (−2, 2, 0) | | |
| Fc_Q | | (4, −10, 0) | (8, −12, $SGN_Q$) |
| $\overline{Fc\_Q}$ and Fa_Q | | (2, −4, 0) | (5, −3, $SGN_Q$) |
| $\overline{Fc\_Q}$ and $\overline{Fa\_Q}$ | | (4, −6, 0) | (2, 0, $SGN_Q$) |

In the illustrated configuration, the secondary scaling tables 556 may provide a set of secondary scalars $(\alpha_I, \beta_I, \gamma_I)$ and $(\alpha_Q, \beta_Q, \gamma_Q)$ for each modulation order (M) 520. These secondary scalars may further scale the slope and vertical intercept of the lines used to approximate the LLRs 522. The flags 555 may indicate the following SNR (S) 518 ranges:

TABLE 5

Flags indicating SNR range

| Flag | SNR (S) 518 |
|---|---|
| Fa_I | Di > SS |
| $\overline{Fa\_I}$ | Di ≤ SS |
| Fa_Q | Dq < SS |
| $\overline{Fa\_Q}$ | Dq ≤ SS |
| Fb_I | Di > 2 * SS |
| $\overline{Fb\_I}$ | Di ≤ 2 * SS |
| Fb_Q | Dq > 2 * SS |
| $\overline{Fb\_Q}$ | Dq ≤ 2 * SS |
| Fc_I | Di > 3 * SS |
| $\overline{Fc\_I}$ | Di ≤ 3 * SS |
| Fc_Q | Dq > 3 * SS |
| $\overline{Fc\_Q}$ | Dq ≤ 3 * SS |

Thus, the flags 555 may indicate the SNR (S) 518 range in terms of the intermediate values 542.

The LLR logic 558 may then approximate the LLRs 522 based on the intermediate values 542, the primary scalars A and B, and the secondary scaling tables 556. In other words, the LLRs 522 may have an in-phase component, $LLR_I$, and a quadrature component, $LLR_Q$, and may be computed using the following equations:

$$LLR_I = \gamma_I(A\alpha_I|Y_I| + B\beta_I S) = \gamma_I(\alpha_I Di + \beta_I SS) \quad (8)$$

$$LLR_Q = \gamma_Q(A\alpha_Q|Y_Q| + B\beta_Q S) = \gamma_Q(\alpha_Q Dq + \beta_Q SS) \quad (9)$$

In this way, the LLR engine 514 may approximate a piecewise linear approximation of the LLRs 522 that may use minimum resources and a single, unified LLR engine 514. In other words, the systems and methods disclosed herein may allow for a single hardware block to calculate the LLRs 522. Note also that equations (8) and (9) may enable the LLR engine 514 to calculate an LLR 522 for any Yi 515, Yq 517, S 518, M 520, etc. This may include using equations (8) and (9). For example, the final equations for the LLR 522, based on equations (8) and (9), may take the following forms:

TABLE 6

Final LLR approximation for QPSK

| Bit | LLR |
|-----|-----|
| c0  | $LLR(c_0) = SGN_I D_I$ |
| c1  | $LLR(c_1) = SGN_Q D_Q$ |

TABLE 7

Final LLR approximation for 8PSK

| Bit | LLR |
|-----|-----|
| c0  | $LLR(c_0) = 2\left(\cos\left(\frac{\pi}{8}\right) - \sin\left(\frac{\pi}{8}\right)\right)(|Y_I| - |Y_Q|)$ |
| c1  | $LLR(c_1) = SGN_I D_I$ |
| c2  | $LLR(c_2) = SGN_Q D_Q$ |

TABLE 8

Final LLR approximation for 16QAM

| Bit | LLR |
|-----|-----|
| c0 | $LLR(c_0) = 2D_I - 2SS$ |
| c1 | $LLR(c_1) = SGN_I \cdot \begin{cases} 4.D_I - 2.SS & \text{if } SS < D_I \\ 2.D_I & \text{if } D_I \leq SS \end{cases}$ |
| c2 | $LLR(c_2) = 2.D_Q - 2.SS$ |
| c3 | $LLR(c_3) = SGN_Q \cdot \begin{cases} 4.D_Q - 2.SS & \text{if } SS < D_Q \\ 2.D_Q & \text{if } D_Q \leq SS \end{cases}$ |

TABLE 9

Final LLR approximation for 64QAM

| Bit | LLR |
|-----|-----|
| c0 | $LLR(c_0) = 2.D_I - 6.SS \quad \text{if } 2.SS < D_I$<br>$\phantom{LLR(c_0)} = -2.D_I + 2.SS \quad \text{if } D_I \leq 2.SS$ |
| c1 | $LLR(c_1) = 4.D_I - 10.SS \quad \text{if } 3.SS < D_I$<br>$\phantom{LLR(c_1)} = 2.D_I - 4.SS \quad \text{if } SS < D_I \leq 3.SS$<br>$\phantom{LLR(c_1)} = 4.D_I - 6.SS \quad \text{if } D_I \leq SS$ |
| c2 | $LLR(c_2) = SGN_I \begin{cases} 8.D_I - 12.SS & \text{if } 3.SS < D_I \\ 5.D_I - 3.SS & \text{if } SS < D_I \leq 3.SS \\ 2.D_I & \text{if } D_I \leq SS \end{cases}$ |
| c3 | $LLR(c_3) = 2.D_Q - 6.SS \quad \text{if } 2.SS < D_Q$<br>$\phantom{LLR(c_3)} = -2.D_Q + 2.SS \quad \text{if } D_Q \leq 2.SS$ |
| c4 | $LLR(c_4) = 4.D_Q - 10.SS \quad \text{if } 3.SS < D_Q$<br>$\phantom{LLR(c_4)} = 2.D_Q - 4.SS \quad \text{if } SS < D_Q \leq 3.SS$<br>$\phantom{LLR(c_4)} = 4.D_Q - 6.SS \quad \text{if } D_Q \leq SS$ |
| c5 | $LLR(c_5) = SGN_Q \cdot \begin{cases} 8.D_Q - 12.SS & \text{if } 3.SS < D_Q \\ 5.D_Q - 3.SS & \text{if } SS < D_Q \leq 3.SS \\ 2.D_Q & \text{if } D_Q \leq SS \end{cases}$ |

Note that since the LLRs 522 may be symmetric, each LLR 522 may be approximated using only the in-phase bits of the symbol (Yi) 515 or the quadrature bits of the symbol (Yq) 517. For example, the approximation of the LLR 522 for the c0th bit in QPSK may include only $SGN_I$ and $D_I$. Likewise, the approximation of the LLR 522 for the c1st bit in QPSK may include only $SGN_Q$ and $D_Q$. Additionally, the approximations for each LLR 522 may be combined to form an LLR 522 for the entire demodulated symbol 516.

The LLR Engine 514 may then send the LLRs 522, among other data, to the decoder 526 for further processing. The decoder 526 may use any suitable decoding method, e.g., Turbo decoding, Viterbi decoding, etc.

Figure 6:
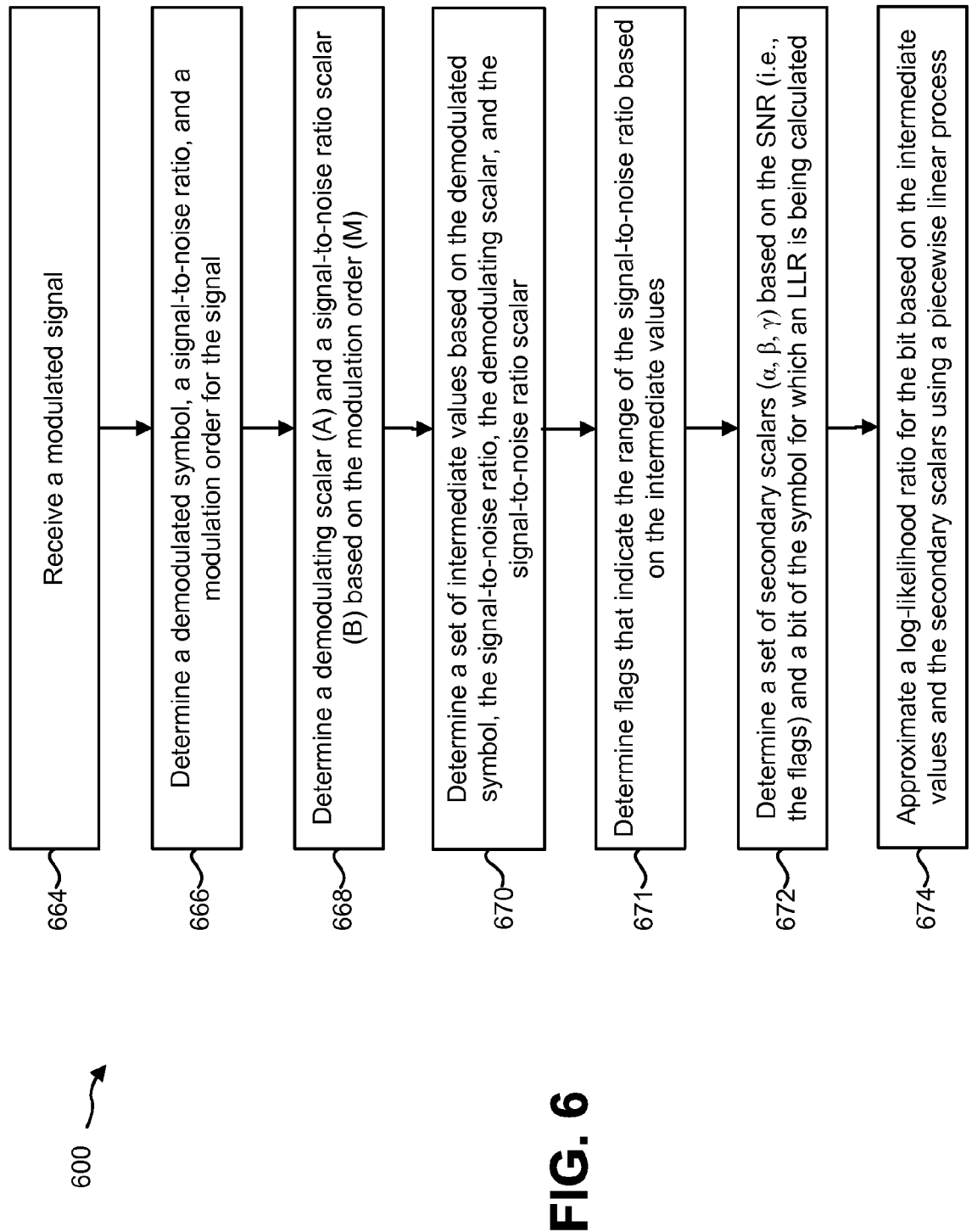
FIG. 6 is a block diagram illustrating a method for approximating log likelihood ratios in a communication system.

FIG. 6 is a block diagram illustrating a method 600 for approximating LLRs 522 in a communication system. The method 600 may be performed by an AT 204. First, the AT 204 may receive 664 a modulated signal. The signal may have been modulated using any suitable technique, e.g., QPSK, 8PSK, 16QAM, 64QAM. The AT 204 may then determine 666 a demodulated symbol 516, a signal-to-noise ratio 518, and a modulation order (M) 520 for the signal. This may include a demodulator 524 demodulating the symbols 516. Furthermore, each symbol 516 may include an in-phase component (Yi) 515 and a quadrature component (Yq) 517. The AT 204 may then determine 668 a demodulating scalar (A) and an SNR scalar (B) based on the modulation order (M) 520. This may include using a primary scaling table 540 that includes a set of fixed values that are dependent on the modulation order 520 used for the demodulated symbols 516. Next, the AT 204 may determine 670 a set of intermediate values based on the demodulated symbol 516, the SNR (S) 518, the demodulating scalar A, and the SNR scalar B. The AT 204 may then determine 671 flags 555 that indicate the range of the SNR (S) 518. The AT 204 may then determine 672 a set of secondary scalars based on the SNR (S) 518 and a bit of the symbol 516 for which an LLR 522 is being calculated, e.g., c0, c1, c2, etc. This may include using a secondary scaling table 556 that may be based, in part, on the flags 555. Lastly, the AT 204 may approximate 674 an LLR 522 for the bit based on the intermediate values 542 and the secondary scalars using a piecewise linear process.

Figure 6A:
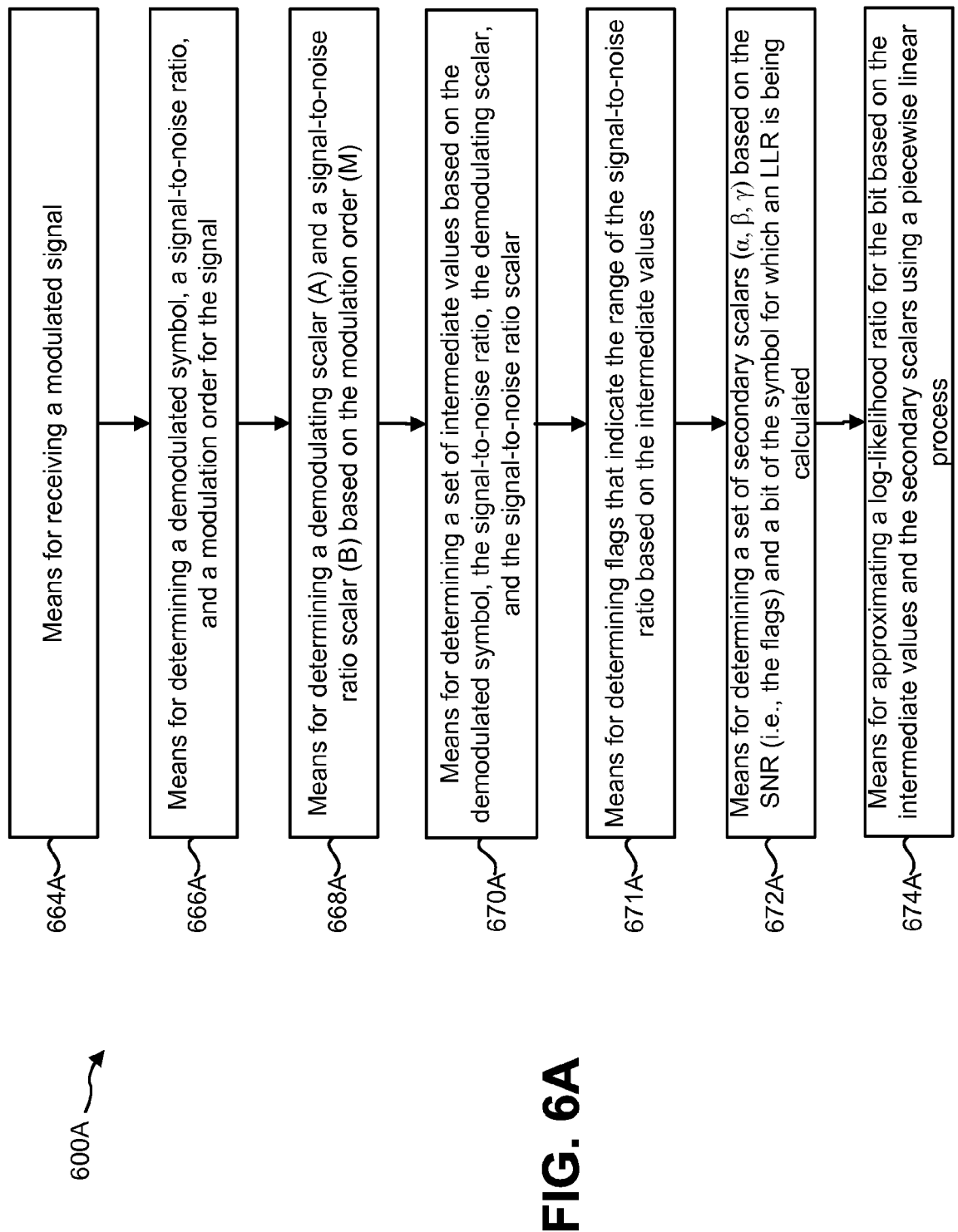
FIG. 6A illustrates means-plus-function blocks corresponding to the method of FIG. 6.

The method 600 of FIG. 6 described above may be performed by various hardware and/or software component(s) and/or module(s) corresponding to the means-plus-function blocks 600A illustrated in FIG. 6A. In other words, blocks 664 through 674 illustrated in FIG. 6 correspond to means-plus-function blocks 664A through 674A illustrated in FIG. 6A.

Figure 7:
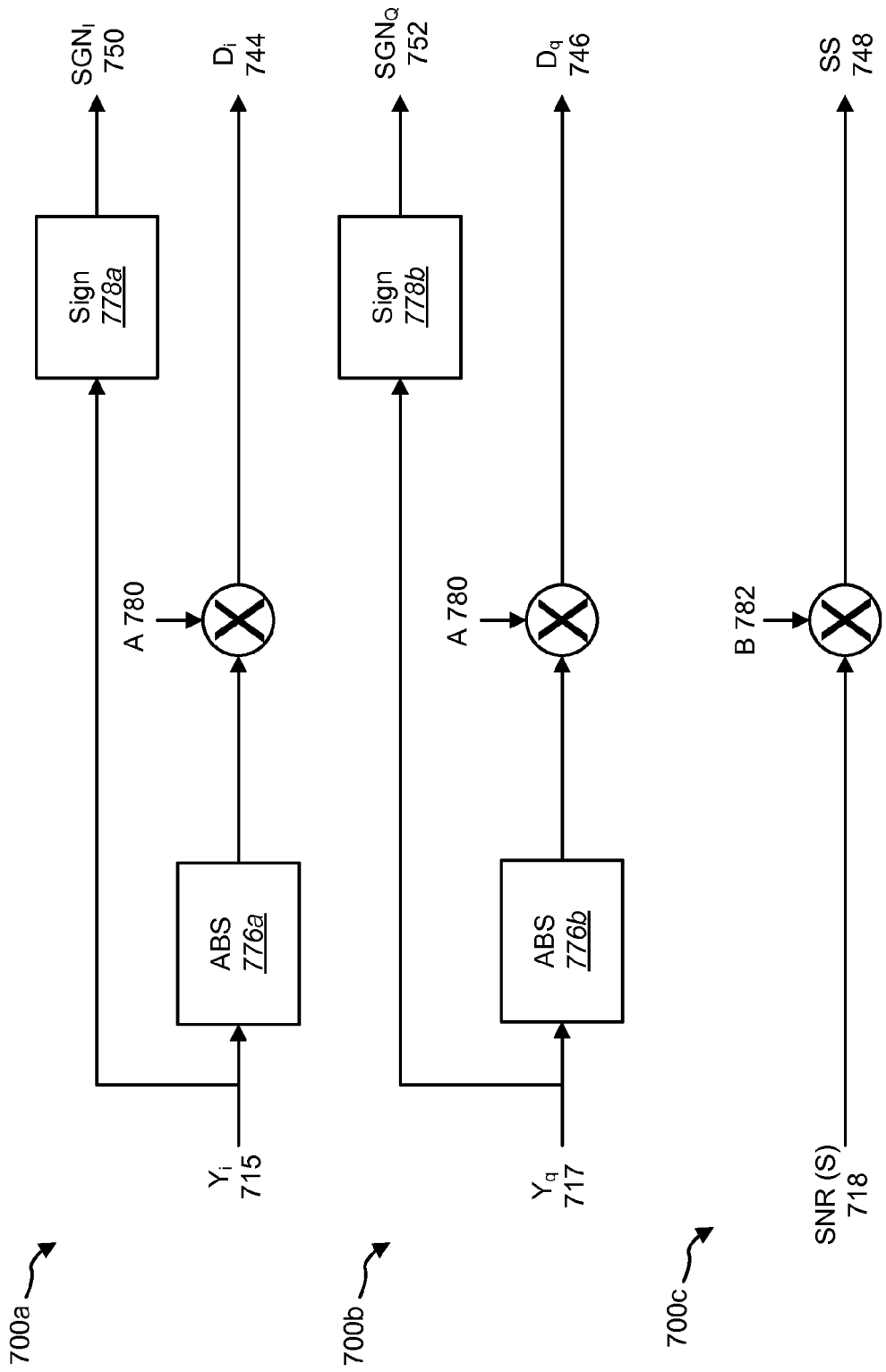
FIG. 7 is a block diagram illustrating three configurations of a system for calculating intermediate values.

FIG. 7 is a block diagram illustrating three configurations of a system 700 for calculating intermediate values. In other words, the three illustrated configurations may implement equations (3)-(7). In the first system 700a, the sign of Yi 715 may be determined by a sign apparatus 778a to determine $SGN_I$ 750. Likewise, an absolute value apparatus 776a may determine the absolute value of Yi 715, then multiply Yi 715 by A 780 to produce Di 744. In a similar manner, the second system 700b may use a sign apparatus 778b to take the sign of Yq 717 to determine $SGN_Q$ 752. Likewise, an absolute value apparatus 776b may determine the absolute value of Yq 717, then multiply Yq 717 by A 780 to produce Dq 746. The third system 700c may receive the SNR (S) 718 as input and multiply it by B 782 to produce SS 748.

Figure 8:
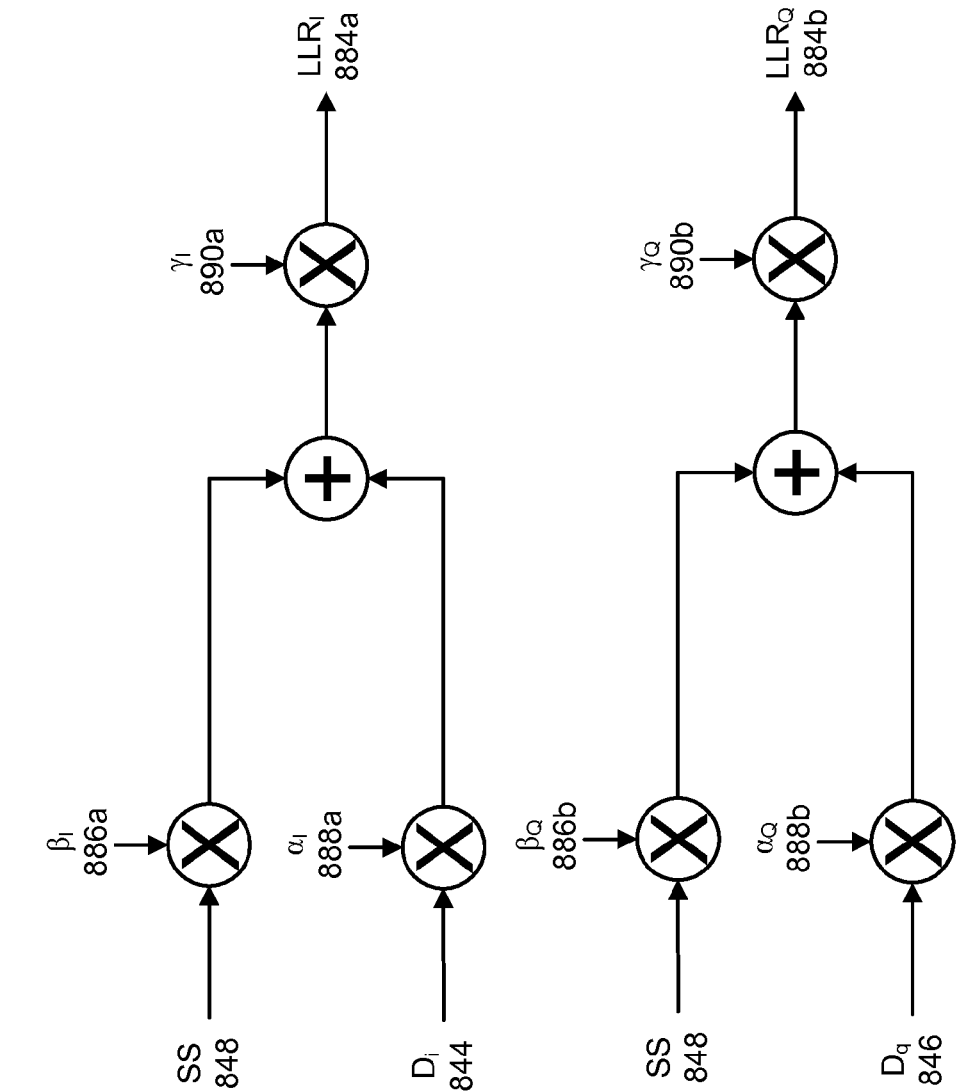
FIG. 8 is a block diagram illustrating another configuration of a system for approximating log likelihood ratios.

FIG. 8 is a block diagram illustrating one configuration of a system 800 for approximating LLRs 522. The system 800 may produce an LLRi 884a that is a piecewise linear approximation of the LLR for Yi 515 and an LLRq 884b that is a piecewise linear approximation of the LLR for Yq 517.

The system 800 may reside in the LLR logic 558 illustrated in FIG. 5. Furthermore, the system 800 may operate best for modulation techniques with a square constellation diagram. In other words, the system 800 may not work for the c0th bit in a symbol modulated with 8PSK because Yi 515 and Yq 517 may not be independent. A configuration for determining the c0th bit for 8PSK modulation will be discussed below.

The system 800 may receive intermediate values 542 as input, e.g., SS 848, Di 844, and Dq 846. SS 848 may be multiplied by $B_I$ 886a and summed with Di 844 that has been multiplied by $\alpha_I$ 888a before being multiplied by $\gamma_I$ 890a to produce the in-phase LLR, LLRi 884a. Likewise, SS 848 may be multiplied by $\beta_Q$ 886b and summed with Dq 846 that has been multiplied by $\alpha_Q$ 888b before being multiplied by $\gamma_Q$ 890b to produce the quadrature LLR, LLRq 884b. LLRi 884a and LLRq 884b may then be summed to produce the final LLR 522.

Figure 9:
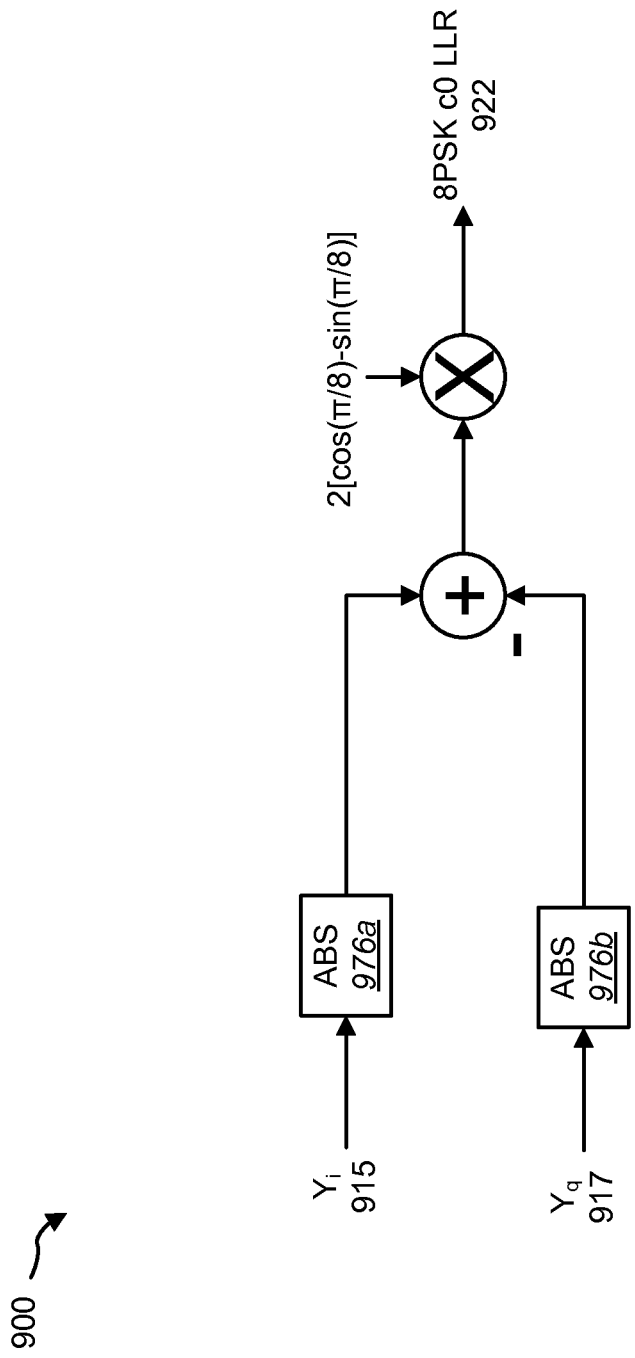
FIG. 9 is another configuration of a system for approximating log likelihood ratios.

FIG. 9 is another configuration of a system 900 for approximating LLRs 922. The system 900 may reside in the LLR logic 558 illustrated in FIG. 5. The system 900 may work for symbols modulated with non-square constellation diagrams. In other words, the system 900 may be designed for the c0th bit in a symbol modulated with 8PSK. Yi 915 and Yq 917 may each be processed by an absolute value module 976a, 976b and summed before being multiplied by $2(\cos(\pi/8)-\sin(\pi/8))$ to produce the 8PSK c0th LLR 922.

Figure 10:
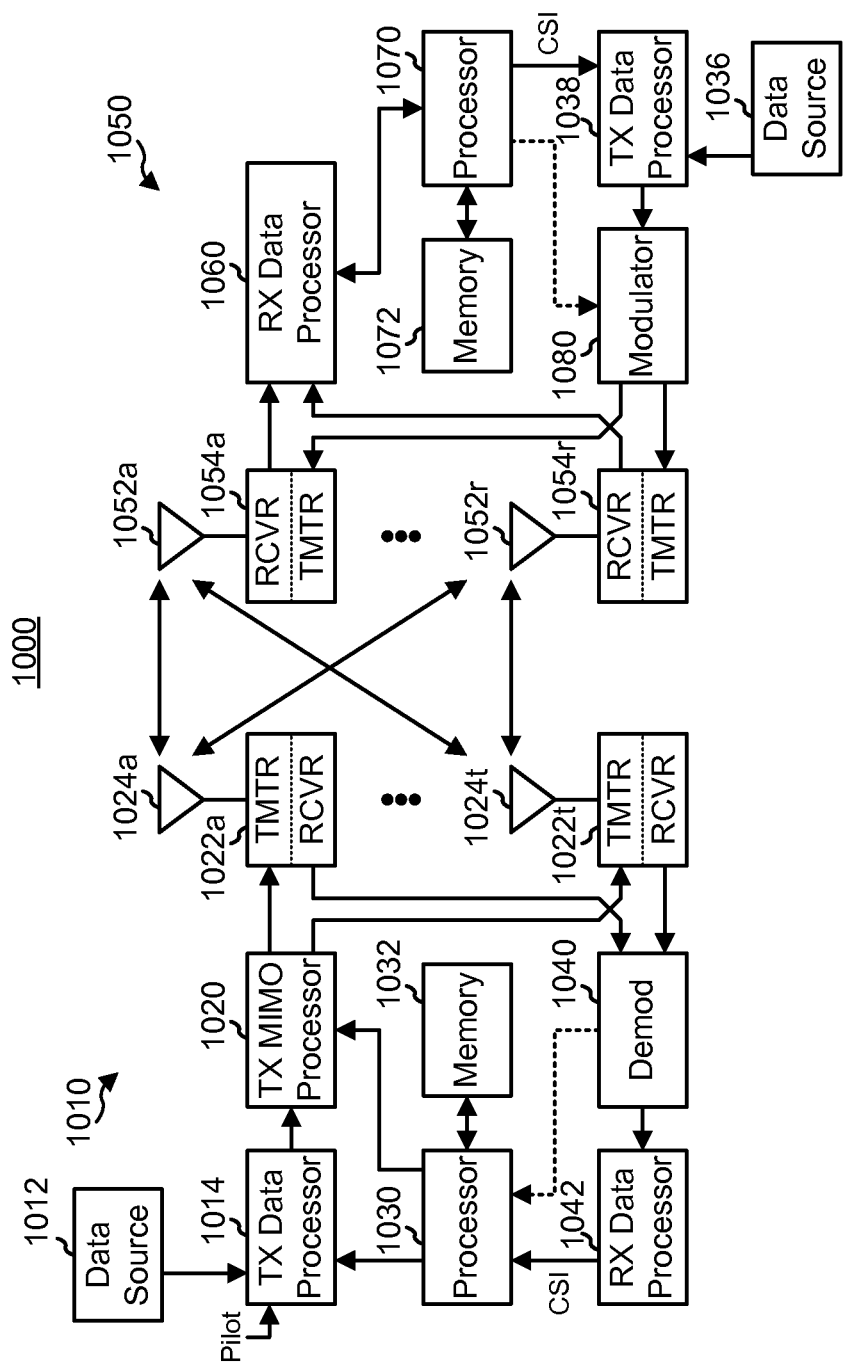
FIG. 10 is a block diagram of a transmitter system and a receiver system in a MIMO system.

FIG. 10 is a block diagram of a transmitter system 1010 (also known as the access point) and a receiver system 1050 (also known as access terminal) in a MIMO system 1000. For example, the system 1000 may be implemented in an AT 204 or an AP 202. At the transmitter system 1010, traffic data for a number of data streams may be provided from a data source 1012 to a transmit (TX) data processor 1014.

In one configuration, each data stream may be transmitted over a respective transmit antenna. The TX data processor 1014 may format, encode, and interleave the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream may then be modulated (i.e., symbol mapped) based on a particular modulation scheme (e.g., QPSK, 8PSK, 16QAM, 64QAM) selected for that data stream to provide modulation symbols. The data rate, coding, and modulation for each data stream may be determined by instructions performed by processor 1030.

The modulation symbols for all data streams may then be provided to a TX MIMO processor 1020, which may further process the modulation symbols (e.g., for OFDM). TX MIMO processor 1020 then provides $N_T$ modulation symbol streams to $N_T$ transmitters (TMTR) 1022a through 1022t. In some configurations, TX MIMO processor 1020 may apply beamforming weights to the symbols of the data streams and to the antenna from which the symbol is being transmitted.

Each transmitter 1022 may receive and process a respective symbol stream to provide one or more analog signals, and further condition (e.g., amplifies, filters, and upconverts) the analog signals to provide a modulated signal suitable for transmission over the MIMO channel. $N_T$ modulated signals from transmitters 1022a through 1022t may then be transmitted from $N_T$ antennas 1024a through 1024t, respectively.

At receiver system 1050, the transmitted modulated signals may be received by $N_R$ antennas 1052a through 1052r and the received signal from each antenna 1052 may be provided to a respective receiver (RCVR) 1054a through 1054r. Each receiver 1054 may condition (e.g., filters, amplifies, and downconverts) a respective received signal, digitize the conditioned signal to provide samples, and further process the samples to provide a corresponding "received" symbol stream.

An RX data processor 1060 may then receive and process the $N_R$ received symbol streams from $N_R$ receivers 1054 based on a particular receiver processing technique to provide $N_T$ "detected" symbol streams. The RX data processor 1060 may then demodulate, deinterleave, and decode each detected symbol stream to recover the traffic data for the data stream. The processing by RX data processor 1060 may be complementary to that performed by TX MIMO processor 1020 and TX data processor 1014 at transmitter system 1010.

A processor 1070 may periodically determine which precoding matrix to use (discussed below). The processor 1070 may also formulate a reverse link message comprising a matrix index portion and a rank value portion.

The reverse link message may comprise various types of information regarding the communication link and/or the received data stream. The reverse link message may then be processed by a TX data processor 1038, which may also receive traffic data for a number of data streams from a data source 1036, modulated by a modulator 1080, conditioned by transmitters 1054a through 1054r, and transmitted back to the transmitter system 1010.

At the transmitter system 1010, the modulated signals from receiver system 1050 may be received by the antennas 1024, conditioned by the receivers 1022, demodulated by a demodulator 1040, and processed by a RX data processor 1042 to extract the reserve link message transmitted by the receiver system 1050. The processor 1030 may then determine which pre-coding matrix to use for determining the beamforming weights and then process the extracted message.

The processors 1030, 1070 may be in electronic communication with memory for storing data or instructions. For example, processor 1030 may be in electronic communication with memory 1032, and processor 1070 may be in electronic communication with memory 1072.

Figure 11:
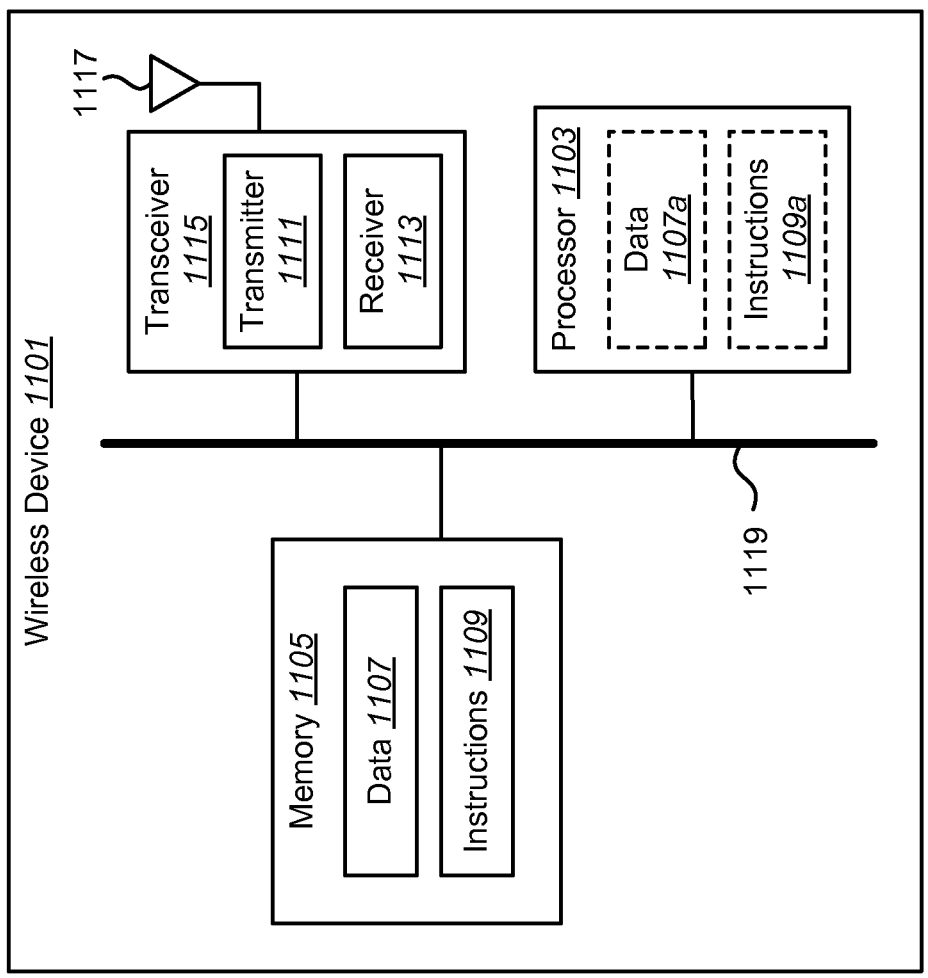
FIG. 11 illustrates certain components that may be included within a wireless device.

FIG. 11 illustrates certain components that may be included within a wireless device 1101. The wireless device 1101 may be an access terminal (AT) 204 or an access point (AP) 202.

The wireless device 1101 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although a single processor 1103 is shown in the wireless device 1101 of FIG. 11, in an alternative configuration, a combination of processors (e.g., an ARM and DSP) could be used.

The wireless device 1101 also includes memory 1105. The memory 1105 may be any electronic component capable of storing electronic information. The memory 1105 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1107 and instructions 1109 may be stored in the memory 1105. The instructions 1109 may be executable by the processor 1103 to implement the methods disclosed herein. Executing the instructions 1109 may involve the use of the data 1107 that is stored in the memory 1105.

The wireless device 1101 may also include a transmitter 1111 and a receiver 1113 to allow transmission and reception of signals between the wireless device 1101 and a remote location. The transmitter 1111 and receiver 1113 may be collectively referred to as a transceiver 1115. An antenna 1117 may be electrically coupled to the transceiver 1115. The wireless device 1101 may also include (not shown) multiple transmitters, multiple receivers, multiple transceivers and/or multiple antenna.

The various components of the wireless device 1101 may be coupled together by one or more buses, which may include a power bus, a control signal bus, a status signal bus, a data bus, etc. For the sake of clarity, the various buses are illustrated in FIG. 11 as a bus system 1119.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements. The terms "instructions" and "code" may be used interchangeably herein.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 6, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for computing log likelihood ratios in a communication system, comprising:
   receiving a demodulated symbol corresponding to a modulated symbol;
   determining, from a primary scalar table, a first set of scalars based on a modulation order of the modulated symbol, the first set of scalars including a demodulation scalar and a signal-to-noise ratio (SNR) scalar;
   determining intermediate values based on the demodulated symbol, an SNR of the demodulated symbol, and the first set of scalars, the intermediate values including a first intermediate value that is a product between the demodulating scalar and an in-phase component of the demodulated symbol, a second intermediate value that is a product of the demodulating scalar and a quadrature component of the demodulated symbol, and a third intermediate value that is a product of the SNR scalar and the SNR;
   selecting a secondary scalar table from among a plurality of secondary scalar tables based on the modulation order;
   determining, from the selected secondary scalar table, a second set of scalars based on the SNR of the demodulated symbol and a bit of the demodulated symbol; and
   approximating, based at least on the first intermediate value, the second intermediate value, the third intermediate value, and the second set of scalars, at least one log likelihood ratio for the bit of the demodulated symbol using a piecewise linear process.

2. The method of claim 1, wherein the modulation order is a metric that indicates a modulation technique that was used to modulate the modulated symbol.

3. The method of claim 1, wherein the modulated symbol was modulated using one of Quadrature Phase Shift Keying (QPSK), 8 Phase Shift Keying (8PSK), 16 Quadrature Amplitude Modulation (16QAM), 32 Quadrature Amplitude Modulation (32QAM), 64 Quadrature Amplitude Modulation (64QAM), and 256 Quadrature Amplitude Modulation (256QAM).

4. The method of claim 1, wherein the approximating comprises determining a line, wherein the demodulation scalar of the first set of scalars indicates a slope for the line and the SNR scalar of the first set of scalars indicates a vertical intercept for the line.

5. The method of claim 4, wherein the approximating comprises determining more than one line if the modulation order indicates that the modulated symbol was modulated using one of 16 Quadrature Amplitude Modulation (16QAM), 32 Quadrature Amplitude Modulation (32QAM), 64 Quadrature Amplitude Modulation (64QAM), and 256 Quadrature Amplitude Modulation (256QAM).

6. The method of claim 1, wherein the approximating further comprises approximating a log likelihood ratio for every bit of the demodulated symbol.

7. The method of claim 1, wherein the approximating uses in-phase bits of the demodulated symbol (I) and not quadrature bits of the demodulated symbol (Q), or the approximating uses the quadrature bits of the demodulated symbol (Q) and not the in-phase bits of the demodulated symbol (I).

8. The method of claim 1,
   the at least one log likelihood ratio comprises a plurality of log likelihood ratios;
   wherein the plurality of log likelihood ratios are combined to form a log likelihood ratio for all of the demodulated symbol.

9. The method of claim 1, comprising:
   determining, based on the intermediate values, a flag that indicates a range of the SNR;
   wherein the secondary set of scalars is based on the flag.

10. The method of claim 1, wherein at least one of the first set of scalars is selected based on whether the SNR exceeds one of the first intermediate value and the second intermediate value.

11. The method of claim 1, wherein at least one of the intermediate values is a sign of the in-phase component of the demodulated symbol.

12. The method of claim 1, wherein at least one of the intermediate values is a sign of the quadrature component of the demodulated symbol.

13. The method of claim 1, further comprising:
   storing the plurality of secondary scalar tables;
   wherein each secondary scalar table corresponds to a respective modulation order.

14. The method of claim 1, wherein the approximating comprises determining a line,
   wherein the demodulation scalar indicates a slope for the line and the SNR scalar indicates a vertical intercept for the line.

15. An apparatus for computing log likelihood ratios in a communication system, comprising:
   a processor;
   memory in electronic communication with the processor;
   instructions stored in the memory, the instructions being executable by the processor to:
     receive a demodulated symbol corresponding to a modulated symbol;
     determine, from a primary scalar table, a first set of scalars based on a modulation order of the modulated symbol, the first set of scalars including a demodulation scalar and a signal-to-noise ratio (SNR) scalar;
     determine intermediate values based on the demodulated symbol, an SNR of the demodulated symbol, and the first set of scalars, the intermediate values including a first intermediate value that is a product between the demodulating scalar and an in-phase component of the demodulated symbol, a second intermediate value that is a product of the demodulating scalar and a quadrature component of the demodulated symbol, and a third intermediate value that is a product of the SNR scalar and the SNR;
     select a secondary scalar table from among a plurality of secondary scalar tables based on the modulation order;
     determine, from the selected secondary scalar table, a second set of scalars based on the (SNR) of the demodulated symbol and a bit of the demodulated symbol; and
     approximate, based at least on the first intermediate value, the second intermediate value, the third intermediate value, and the second set of scalars, at least one log likelihood ratio for the bit of the demodulated symbol using a piecewise linear process.

16. The apparatus of claim 15, wherein the modulation order is a metric that indicates a modulation technique that was used to modulate the modulated symbol.

17. The apparatus of claim 15, wherein the modulated symbol was modulated using one of Quadrature Phase Shift Keying (QPSK), 8 Phase Shift Keying (8PSK), 16 Quadrature Amplitude Modulation (16QAM), 32 Quadrature Amplitude Modulation (32QAM), 64 Quadrature Amplitude Modulation (64QAM), and 256 Quadrature Amplitude Modulation (256QAM).

18. The apparatus of claim 15, wherein the instructions executable to approximate comprise instructions executable to determine a line, wherein the demodulation scalar of the first set of scalars indicates a slope for the line and the SNR scalar of the first set of scalars indicates a vertical intercept for the line.

19. The apparatus of claim 18, wherein the instructions executable to approximate further comprise instructions executable to determine more than one line if the modulation order indicates that the modulated symbol was modulated using one of 16 Quadrature Amplitude Modulation (16QAM), 32 Quadrature Amplitude Modulation (32QAM), 64 Quadrature Amplitude Modulation (64QAM), and 256 Quadrature Amplitude Modulation (256QAM).

20. The apparatus of claim 15, wherein the instructions executable to approximate further comprise instructions executable to approximate a log likelihood ratio for every bit of the demodulated symbol.

21. The apparatus of claim 15, wherein the instructions executable to approximate further comprise instructions executable to use in-phase bits of the demodulated symbol (I) and not quadrature bits of the demodulated symbol (Q), or instructions executable to use the quadrature bits of the demodulated symbol (Q) and not the in-phase bits of the demodulated symbol (I).

22. The apparatus of claim 15,
the at least one log likelihood ratio comprises a plurality of log likelihood ratios;
wherein the plurality of log likelihood ratios are combined to form a log likelihood ratio for all of the demodulated symbol.

23. An apparatus for computing log likelihood ratios in a communication system, comprising:
means for receiving a demodulated symbol corresponding to a modulated symbol;
means for determining, from a primary scalar table, a first set of scalars based on modulation order of the modulated symbol, the first set of scalars including a demodulation scalar and a signal-to-noise ratio (SNR) scalar;
means for determining intermediate values based on the demodulated symbol, an SNR of the demodulated symbol, and the first set of scalars, the intermediate values including a first intermediate value that is a product between the demodulating scalar and an in-phase component of the demodulated symbol, a second intermediate value that is a product of the demodulating scalar and a quadrature component of the demodulated symbol, and a third intermediate value that is a product of the SNR scalar and the SNR;
means for selecting a secondary scalar table from among a plurality of secondary scalar tables based on the modulation order;
means for determining, from the selected secondary scalar table, a second set of scalars based the (SNR) of the demodulated symbol and a bit of the demodulated symbol;
and
means for approximating, based at least on the first intermediate value, the second intermediate value, the third intermediate value, and the second set of scalars, at least one log likelihood ratio for the bit of the demodulated symbol using a piecewise linear process.

24. The apparatus of claim 23, wherein the modulation order is a metric that indicates a modulation technique that was used to modulate the symbol.

25. The apparatus of claim 23, wherein the modulated symbol was modulated using one of Quadrature Phase Shift Keying (QPSK), 8 Phase Shift Keying (8PSK), 16 Quadrature Amplitude Modulation (16QAM), 32 Quadrature Amplitude Modulation (32QAM), 64 Quadrature Amplitude Modulation (64QAM), and 256 Quadrature Amplitude Modulation (256QAM).

26. The apparatus of claim 23, wherein the means for approximating comprises means for determining a line, wherein the demodulation scalar of the first set of scalars indicates a slope for the line and the SNR scalar of the first set of scalars indicates a vertical intercept for the line.

27. The apparatus of claim 26, wherein the means for approximating comprises means for determining more than one line if the modulation order indicates that the modulated symbol was modulated using one of 16 Quadrature Amplitude Modulation (16QAM), 32 Quadrature Amplitude Modulation (32QAM), 64 Quadrature Amplitude Modulation (64QAM) or 256 Quadrature Amplitude Modulation (256QAM).

28. The apparatus of claim 23, wherein the means for approximating further comprises means for approximating a log likelihood ratio for every bit of the demodulated symbol.

29. The apparatus of claim 23, wherein the means for approximating uses in-phase bits of the demodulated symbol (I) and not quadrature bits of the demodulated symbol (Q), or the means for approximating uses the quadrature bits of the demodulated symbol (Q) and not the in-phase bits of the demodulated symbol (I).

30. The apparatus of claim 23,
the at least one log likelihood ratio comprises a plurality of log likelihood ratios;
wherein the plurality of log likelihood ratios are combined to form a log likelihood ratio for all of the demodulated symbol.

31. A computer-program product for computing log likelihood ratios in a communication system, the computer-program product comprising a non-transitory computer-readable medium having instructions thereon, the instructions comprising:
code for receiving a demodulated symbol corresponding to a modulated symbol;
code for determining, from a primary scalar table, a first set of scalars based on a modulation order of the modulated symbol, the first set of scalars including a demodulation scalar and a signal-to-noise ratio (SNR) scalar;
code for determining intermediate values based on the demodulated symbol, an SNR of the demodulated symbol, and the first set of scalars, the intermediate values including a first intermediate value that is a product between the demodulating scalar and an in-phase component of the demodulated symbol, a second intermediate value that is a product of the demodulating scalar and a quadrature component of the demodulated symbol, and a third intermediate value that is a product of the SNR scalar and the SNR;
code for selecting a secondary scalar table from among a plurality of secondary scalar tables based on the modulation order;
code for determining, from the selected secondary scalar table, a second set of scalars based on the (SNR) of the demodulated symbol and a bit of the demodulated symbol; and code for approximating, based at least on the first intermediate value, the second intermediate value, the third intermediate value, and the second set of scalars, at least one log likelihood ratio for the bit of the demodulated symbol using a piecewise linear process.

32. The computer-program product of claim 31, wherein the modulation order is a metric that indicates a modulation technique that was used to modulate the modulated symbol.

33. The computer-program product of claim 31, wherein the modulated symbol was modulated using one of Quadrature Phase Shift Keying (QPSK), 8 Phase Shift Keying (8PSK), 16 Quadrature Amplitude Modulation (16QAM), 32 Quadrature Amplitude Modulation (32QAM), 64 Quadrature Amplitude Modulation (64QAM), and 256 Quadrature Amplitude Modulation (256QAM).

34. The computer-program product of claim 31, wherein the code for approximating comprises code for determining a line, wherein the demodulation scalar of the first set of scalars indicates a slope for the line and the SNR scalar of the first set of scalars indicates a vertical intercept for the line.

35. The computer-program product of claim 34, wherein the code for approximating comprises code for determining more than one line if the modulation order indicates that the modulated symbol was modulated using one of 16 Quadrature Amplitude Modulation (16QAM), 32 Quadrature Amplitude Modulation (32QAM), 64 Quadrature Amplitude Modulation (64QAM), and 256 Quadrature Amplitude Modulation (256QAM).

36. The computer-program product of claim 31, wherein the code for approximating comprises code for approximating a log likelihood ratio for every bit of the demodulated symbol.

37. The computer-program product of claim 31, wherein the code for approximating uses in-phase bits of the demodulated symbol (I) and not quadrature bits of the demodulated symbol (Q), or the code for approximating uses the quadrature bits of the demodulated symbol (Q) and not the in-phase bits of the demodulated symbol (I).

38. The computer-program product of claim 31,
the at least one log likelihood ratio comprises a plurality of log likelihood ratios;
wherein the plurality of log likelihood ratios are combined to form a log likelihood ratio for all of the demodulated symbol.

* * * * *